Jan. 27, 1970   J. A. RIEDENER   3,491,805
MITER CUTTING DEVICE
Filed April 20, 1965   3 Sheets-Sheet 1

INVENTOR
JOSEPH A. RIEDENER

BY *Joseph J. Connerton*
ATTORNEY

United States Patent Office

3,491,805
Patented Jan. 27, 1970

3,491,805
MITER CUTTING DEVICE
Joseph A. Riedener, Kingston, N.Y.
(Box 71, Bloomington, N.Y. 12411)
Filed Apr. 20, 1965, Ser. No. 449,566
Int. Cl. B27b 27/06
U.S. Cl. 143—6    19 Claims

ABSTRACT OF THE DISCLOSURE

A self-measuring double cut-off and miter cutting device comprising a pair of cutting heads movable on a track longitudinally of a work table in both directions, each head being movable about its vertical and horizontal axis, and a locking device for securing the wood stock in the machine during the cutting sequence. Both of the cutting heads are constructed with a solid extremity to engage a pattern piece therebetween thereby the two cut-off ends will be substantially equal to the distance between the edges of the pattern piece.

---

The present invention relates to a woodworking device and more particularly to a device adapted to automatically cut wood stock including miter joining members to conform to an associated pattern piece.

In the woodworking art, one of the most difficult and time consuming operations requiring a high degree of skill and artistry is mitering, since each individual miter must be perfectly fit to conform to its associated pattern piece or jig. Mitering is required in making cabinets, billiard tables, picture frames, storm windows, etc. In the cabinet making art, for example, due to the customized nature of the service provided, mass production techniques are not feasible since door and drawer sizes vary in accordance with each installation. The skilled labor required and the time consumed in the mitering operation add substantially to the time required and correspondingly to the cost of cabinet making.

While devices for simultaneously forming two miter corners are known in the art, such devices generally comprise a pair of saws which are spaced apart by a predetermined distance and require specific settings and adjustments for each change in miter size such that they are not suitable for customized cabinet making. Further, while such devices may be generally satisfactory on a volume production basis, no provision is made for possible deviation of the pattern piece dimensions.

In accordance with the present invention, there is provided a self-measuring double miter-cutting device adapted to automatically cut miters to conform to the size of the associated pattern piece, i.e., the piece which is encompassed by the miter joining members. The device includes two cutting head assemblies, one of the assemblies being mounted on a fixed platform such as a work table, the second cutting assembly being mounted on a platform adapted to move on parallel tracks along the lateral axis of the work table. The movable cutting head assembly is equipped with a solid extremity leading to a separate stationary platform, so that it has to squarely touch the edge of the pattern piece; the stationary cutting head is similarly equipped with such an extremity directly opposed to the other one and also provides adjusting means to control the distance between both extremities without effecting lateral movement of the two cutting heads. After an initial adjustment, the cutting heads are automatically spaced so that the distance between the inner surface of the mitered member is exactly equal to the distance between the two corresponding edges of the pattern piece. The work table on which the device is mounted includes one or more fixed straight edges or gates against which the cutting action is to occur, and means for maintaining the member to be severed firmly against the gate for the complete cutting cycle. Automatic safeguards are provided in the control circuitry in the event of either power or control failure. By successively utilizing the four edges of the pattern piece in sequence as the measuring instrumentalities, and the inner surface of the mitered member as references, perfect mitering joints are ensured irrespective of any size variation of the pattern piece or the depth of the mitered member.

Accordingly, a primary object of the present invention is to provide a self-measuring cutting device.

Another object of the present invention is to provide a self-measuring miter-cutting device.

A further object of the present invention is to provide a self-measuring, double cut-off miter-cutting device adapted to automatically cut a double miter to conform to the size of an associated pattern piece.

Another object of the present invention is to provide a miter-cutting device having fixed and movable cutting heads wherein the distance between the ends of the miter joining members are automatically adjusted to a function of the dimension of the pattern piece.

The foregoing and other objects, features, and advantages of the invention will be apparent from the following more particular description of a preferred embodiment of the invention, as illustrated in the accompanying drawings, in which.

Figure 1:
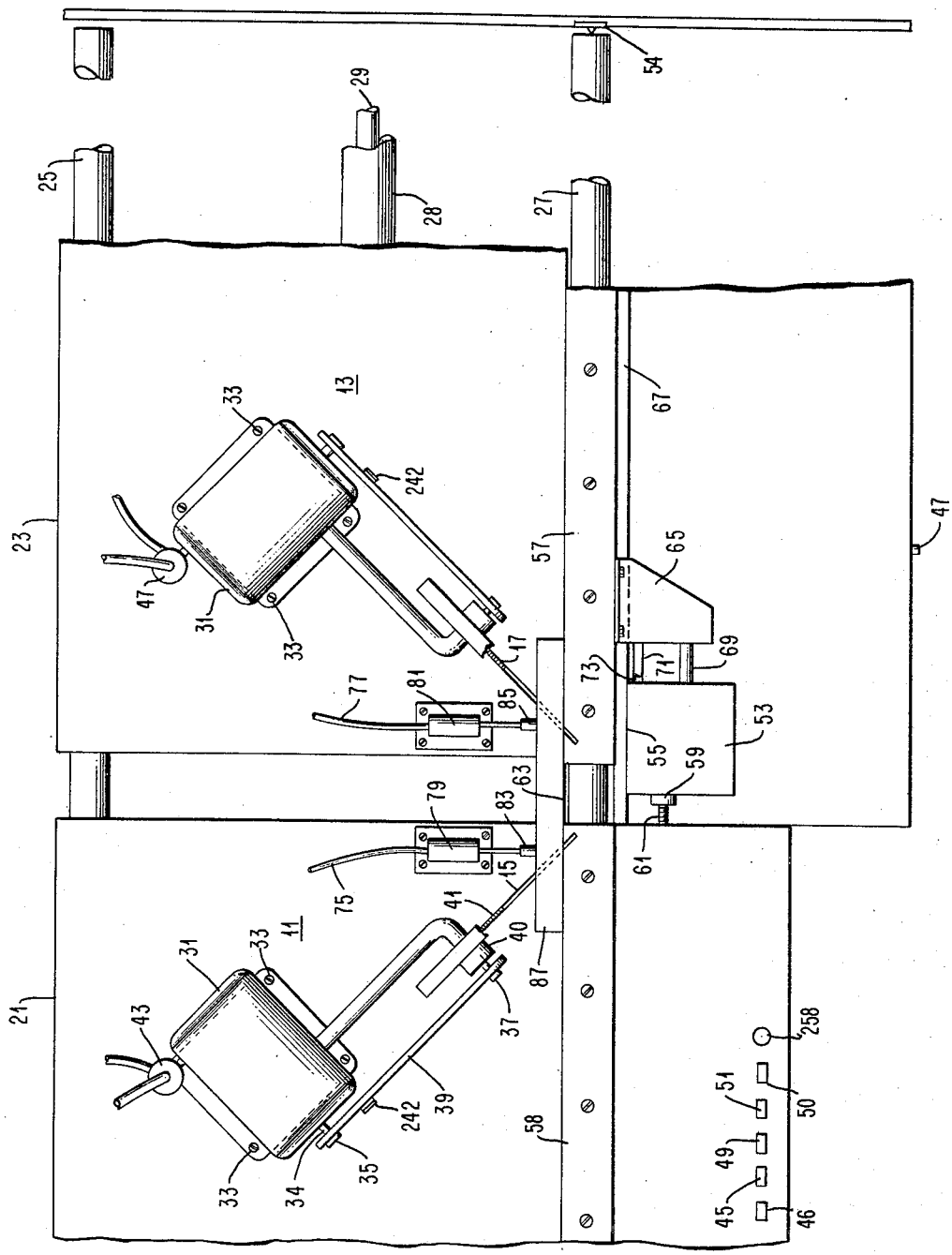
FIG. 1 is a fragmentary plan view of a preferred embodiment of the present invention with a portion of the supporting surface broken away.

Referring to the drawings and more particularly to FIG. 1 thereof, the preferred embodiment of the invention comprises cutting assemblies 11 and 13 mounted on associated platforms, which in the preferred embodiment comprise opposite sides of a work table, only the surface portion of which is illustrated. The cutting assemblies include cutting heads 15 and 17, which in the preferred embodiment herein described comprise rotating saw blades. However, it will be appreciated that the cutting heads could encompass various cutting agents such as knives, cutoff abrasive wheels, high frequency oscillating blades, etc.

Referring specifically to the saw assemblies 11 and 13, each cutting head is movable about its own vertical axis and indexed or locked at any desired angle to the lateral axis of the work table, and also similarly movable about its horizontal axis to cut compound angles. The specific details of the angle indicating and adjustment apparatus are well known in the art, and have accordingly been omitted from the drawings in the interest of clarity. In the preferred embodiment herein described, the cutting heads are assumed adjusted to the conventional 45° miter-cutting angle, although it will be obvious that cuts of any angle including compound angle could be provided.

Saw assembly 11 is mounted on a fixed platform comprising work table surface 21, while the movable platform 23, on which saw assembly 13 is mounted, is movable along parallel tracks 25 and 27 under control of a table operating cylinder 28 along the lateral axis of the table. Cylinder 28 is connected to the table and slides along shaft 29.

Since the two saw assemblies 11 and 13 are identical, a description of one will suffice for an understanding of both. Saw assembly 11 includes motor 31, the base portion of which is shown in phantom, secured to the table surface through bolts 33. The motor assembly 31 includes motor shaft 34, to which is attached pulley 35 which transmits power to shaft 37 through an endless belt 39. Mounted on the opposite end of shaft 37 is a circular saw blade 15. For protective purposes a semi-circular housing 41 covers the upper portion of the saw blade but does not affect its operation. A two-way pneumatic cylinder 43 is utilized to retract cutting head 15 to its normal rest position after each cutting cycle.

A series of switches and control buttons 45, 46, 47, 49, 50 and 51 are shown mounted on the table. To initiate operation, power is applied to the device by on-off button 45. When unload switch 49 is depressed, movable table portion 23 and its associated saw assembly 13 move to the unload position, i.e., travels laterally apart from saw assembly 11 on parallel tracks 25 and 27 a distance sufficient to provide adequate clearance for the pattern piece 53, the ultimate distance being limited by limit switch 54. Pattern piece 53, shown as substantially rectangular, is then inserted in position with horizontal edge 55 serving as the pattern for the miter against the straight bottom edge of fence 67, and the vertical edge against the lateral squaring stop 59, the latter being adjusted by threaded portion 61 to provide the desired relationship between the workpiece and the miter being cut. The relationship between the pattern piece and the holding assembly, as previously described, may be direct, larger or smaller by a predetermined distance, i.e., the double cut miter can conform exactly to the dimensions of the pattern piece or vary in either direction by a predetermined increment. When load button 50 is depressed, air pressure is applied to the control system and table cylinder 28 and its associated cutting assembly moves laterally toward the stationary platform to the load position as above described until the measuring extremities touch the pattern piece firmly and lateral movement is halted by microswitch 73 mounted on stud 71. An indicator 74 indicates that power is applied to the line.

Generally, the distance between the inner edge of the resulting miter will be exactly equal to the distance between the corresponding ends of the pattern piece, although, as previously described, it may be adjusted to plus or minus a present differential by adjusting stop 59. The bracket 65, mounted on fence 57, has two attached measuring extremities 69 and 71, the latter having a microswitch 73 which is actuated by the movement of bracket 65 against pattern piece 54. When actuated, as more fully described hereinafter, microswitch 73 causes the lateral movement of table section 23 to stop and stabilizes the movement of the cutterhead 13 for the duration of the cutting cycle. A locking cycle more fully described hereinafter ensues which ensures firm contact of the stops against the work piece. Residual pressure maintains the movable platform 23 in position for the entire cutting cycle.

The remaining sequence in the cutting cycle operates as follows. In response to actuation of start-cut switches 51 and 47, air pressure is applied via hoses 75 and 77 to spring loaded clamping pistons 79 and 81, the extended terminals 83 and 85 of which clamp the workpiece 87 firmly against the straight edges of gates 57, 58. It will be noted that the saws 17 and 15 cut away from the fence, i.e., the direction of rotation of the saw blade is such as to exert a pulling force away from the fence on the workpiece. But cutting in this manner, an exact miter corner for the pattern piece will always be provided, irrespective of any variation in the width or thickness of the workpiece. In known prior art devices such as those heretofore described, the saw cuts into the fence, i.e., the direction of rotation of the saw blade is such that the basis of reference is the outside rather than the inside linear dimensions of the workpiece. Using the outside dimension as a reference, however, any variation of thickness of the workpiece will produce miter sections which would be too short or too long for the pattern piece. This represents one of the basic causes of inaccuracy in conventional miter-cutting devices and its elimination by the instant invention represents a significant advance in the art. While the above operation utilizes the workpiece against the top portion of fences 57, 58, the workpiece could be maintained against the bottom edge of fences 57, 58 such that the outside dimension of the workpiece would correspond to the dimension of the pattern piece rather than the inside dimension. To accept contoured work pieces, fences 57, 58 can be equipped with a matching edge surface to ensure perfect alignment. Examples of contoured workpieces are picture frame moldings, extrusions, preformed cabinet or door edges having a tongue or similar profile for ultimate joining.

Returning now to the operation of the subject invention, after the cutterheads have moved to the correct position determined by the pattern piece 53 as above described and the workpiece 87 is clamped firmly in position against gates 57, 58 by piston terminals 83 and 85, further travel of the cutterheads is prevented and the workpiece 87 is locked in position during the balance of the load cycle. A pressure sensing device shown and described hereinafter, will release current to operate the cutters only if adequate pressure is present.

The cutting cycle requires that manually operated switches 51, 47 be simultaneously energized and maintained until the cutting cycle is completed and the workpiece is severed, a safety feature which requires use of both hands of the operator during the entire cutting cycle. The cutting devices are actuated in a predetermined sequence according to the size of the orifice of associated pneumatic cylinder 43, 44. Since the velocity of a piston varies as the size of the orifice, the method of providing the desired sequence of cutting operations merely represents a design consideration. In the preferred embodiment herein described, a larger orifice is employed with cylinder 43 such that cutting assembly 11 operates first. However, it will be appreciated that the reverse sequence or simultaneous action could be effected in the above described manner.

In the cutting cycle, the cutting saws must be brought up to speed by their associated motors before the cutting operation. Accordingly, as more fully described hereinafter, a time delay relay is employed to delay the air supply to the pistons until the cutting motors have been brought up to speed. When the air supply is applied through an air valve to the cylinders 43 and 44, which comprise two-way pistons, the initial air supply causes the cutting heads to pivot downward to the cutting position in the above designated sequence and sever their respective portions of the work piece. Parallel connected limit switches 242 are mounted on the side of the saw casting and actuated by the downward movement of the saws. Operation of the second limit switch causes air to be supplied to the pistons for the retract stroke causing both cutting devices to retract to their rest position, in which position they are locked for the remainder of the cycle. Actuation of the limit switches also causes power to the saw motors to be cut, and removes power from the spring loaded clamping pistons 79 and 81, the spring-tension causing the pistons to retract and the workpiece is then released. Details of the control circuitry and operating sequence are fully described hereinafter with reference to FIGS. 2 and 3. Depressing the unload switch 49 will cause table 23 to move laterally to the unload position, thereby releasing the pattern piece 53 which can be rotated 90° or a new pattern piece inserted. To ensure perfect mitering for a pattern piece, each of the four edges could be individually employed as references to safeguard against possible deviation in edge dimensions. Alternatively, a set of jigs conforming to the desired dimensions could be suitably employed.

The requirement that two switches be simultaneously actuated by the operator is a safety design feature to protect the operator from injury by the cutting heads. In addition, power failure at any time will immediately return and lock the cutterheads in their retracted or rest position. The cutterheads are locked in retracted position throughout the operation except for the cutting cycle, and even then only so long as both hands of the operator remain on the two switches spaced at a safe distance from the cutterheads.

Figure 2:
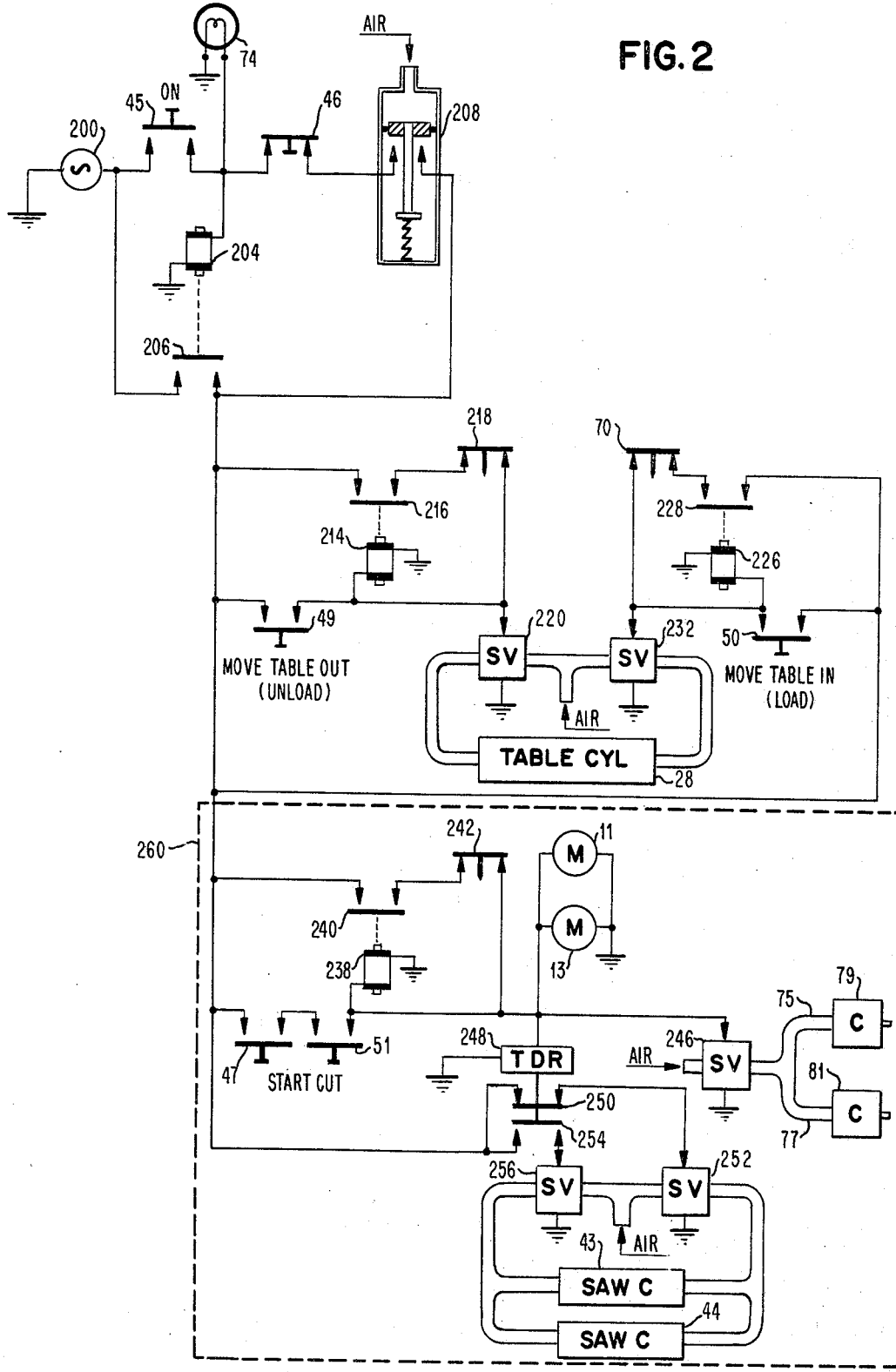
FIG. 2 illustrates in schematic form the electro-pneumatic control apparatus.

Referring now to FIG. 2, there is illustrated a schematic drawing of the electro-pneumatic control system used to control the operation and sequence thereof as above described. In this drawing parts illustrated in FIG. 1 and previously described are identified by corresponding reference numerals.

Power from the line source 200 is applied to the device by depressing the on-off switch 45, which is of the momentary closure type. As soon as this switch is closed, a relay winding 204 is energized thereby closing contacts 206 which complete a holding circuit through relay winding 204 via an air pressure safety switch 208 and a normally closed momentary switch 46. This path will latch the contacts 206, provided there is sufficient air pressure to maintain switch 208 closed. Thus, an air failure or a low pressure condition will open switch 208 whereby power will be removed from the device. Switch 46 is an emergency stop switch which, when actuated, breaks the latch on contacts 206. All power for the device is passed through contacts 206. For simplicity, these have been illustrated as a single set of contacts. However, if the current proves excessive, a multiple contact switch may be substituted.

When a cutting operation is initiated, the movable platform 23 must be transported to the unload position to permit the insertion of a pattern or jig piece. This is accomplished by depressing momentary closure unload switch 49. When unload switch 49 is depressed, relay winding 214 is energized, contacts 216 are closed and then latched via a normally closed momentary switch 54 which opens when platform 23 reaches the unload position to thus break the latch on contacts 216.

While contacts 216 remain latched, power is applied to a solenoid valve 220 which in turn connects the table operation cylinder 28 to the main air supply to cause the cylinder to move the table to the unload position. Unless terminated by releasing switch 49, as soon as the limit of travel is reached, limit switch 54 is actuated by the travel of table section 23 to break the latch on contacts 216 and thus remove power from solenoid valve 220 which, when deenergized, cuts off the air supply to table cylinder 28.

With the table in the unload position, the pattern or jig piece is inserted, as previously described, and load switch 50 is depressed, thus connecting relay winding 226 to the power supply and causing contacts 228 to close. Contacts 228 are latched via a normally closed microswitch 73 which is mounted on the movable platform 23 and opens when the switch actuator 71 engages the pattern piece. A momentary opening of switch 73 releases the latch on contacts 228. As long as contacts 228 are latched, solenoid valve 232 is opened and admits air to the opposite side of table cylinder 28, causing the table to return to the load position. When the table travels enough to permit the work or jig piece previously inserted to actuate switch 73, power is removed from solenoid valve 232 causing the table to stop.

At this time the saws are properly positioned to make the desired cut. The stock or workpiece which is to be cut is inserted as previously described and start-cut switches 51 and 47 are simultaneously depressed, connecting a relay winding 238 to the power line. When energized, winding 238 causes contacts 240 to close and these contacts are then latched via a momentary switch 242 which opens when the saws reach their limit of travel to thus release the latch on contacts 240.

The saw motors 11 and 13 are energized while contacts 240 are latched. In addition, a solenoid valve 246 is energized and connects clamping pistons 79 and 81 to the main air supply through lines 75 and 77, respectively and the stock is securely clamped and read to be cut.

In order to provide sufficient time for the saw motors to come up to speed and to permit clamping of the stock, control of the saw opening cylinders 43 and 44 is effected through a time delay relay 248, which is energized via contacts 240 and switch 242.

Associated with time delay relay 248 are two sets of contacts. One set 250 is normally closed and controls a solenoid valve 252 which admits air to one side of saw cylinders 43 and 44 to maintain the saws in the retracted position. The second set of contacts 254 is normally open and closed when time delay relay 248 is energized. Contacts 254 connect a solenoid valve 256 to the power supply, and valve 256 in turn supplies air pressure to the saw cylinders 43 and 44 to move them downward.

When the saws reach their limit of travel, contacts 242 open momentarily to break the latch on contacts 240, thus deenergizing the saw motors 11 and 13 and solenoid valves 246 and 256. At the same time contacts 250 close and the saws are retracted to the upward position.

In order to assure uniform operation, the orifice to one saw cylinder is reduced and the saw associated with that cylinder actuates limit switch 242. In this way uniform operation and complete cut is assured since this saw is always the last to complete a cut. Two limit switches 242 are illustrated in FIG. 1. However, in the embodiment of FIG. 2, only that limit switch 242 actuated by the last saw to complete its cut need be connected, or alternatively both may be connected in parallel.

An indicator light 74 connected in parallel with relay winding 204 is provided to warn the operator that power is connected to the device. This light is energized only as long as winding 204 is energized. Thus, it becomes extinguished when the device is stopped by an air failure or actuation of emergency stop switch 46.

Under certain conditions, such as when cutting extremely short workpieces, it may be desirable or necessary to have one saw complete its cut before starting the second saw to reduce the possibility of interference. This may be accomplished by substituting the circuit illustrated in FIG. 3 for that portion of the control circuit in FIG. 2 within the dotted section 260.

Figure 3:
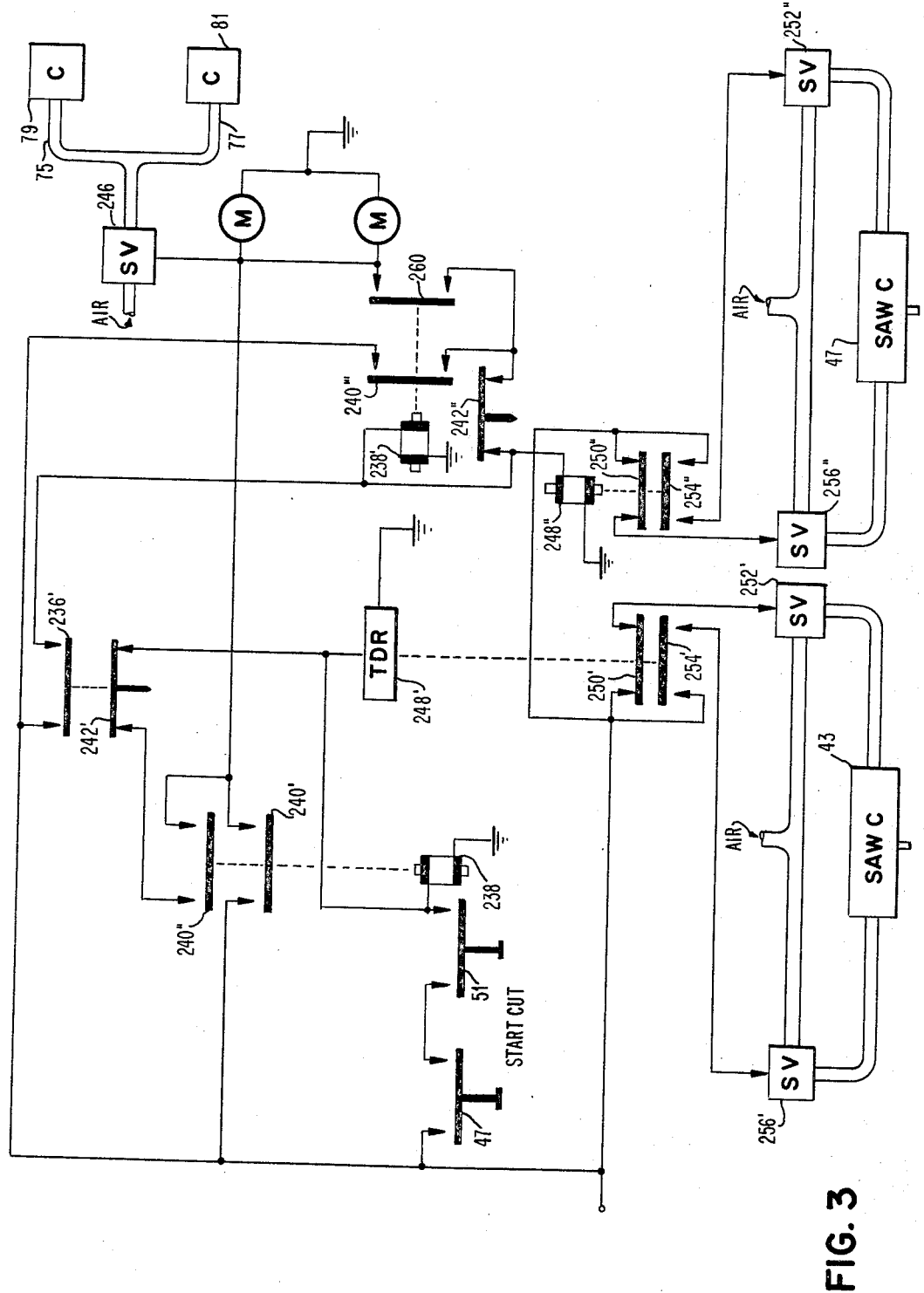
FIG. 3 illustrates in schematic form another control arrangement for that shown in block 260 in FIG. 2.

In FIG. 3, parts identical in structure and function to those previously described bear the same reference numerals. Those parts which are similar in operation to parts previously described are referenced with the same number, however, they have been provided prime designations to distinguish them therefrom.

A cutting operation is initiated by simultaneously depressing switches 51 and 47 to energize relay 238, which closes contacts 240′ and 240″. These contacts are connected in series with a momentary limit switch 242′ to provide a latch for the contacts 240′ and 240″. Thus, as long as they remain latched, a time delay relay 248′ is energized and similarly to the operation previously described, releases the latch on contacts 240′ and 240″ causing that saw to retract to the upward ready position. The limit switch is, in addition, provided with normally open contacts 236′ which cause relay winding 238′ to latch contacts 240″ which in turn causes the second saw 17 to execute a cutting operation similar to that previously described. Upon completion of the second cut, contacts 242″ of the limit switch open and release the latch on contacts 240″, causing the second saw 17 to return to the ready position as previously described. Contacts 240″ and 260 are provided to make available isolated alternate energization paths for the saw motors and solenoid valve 246.

While the invention has been particularly shown and described with reference to a preferred embodiment thereof, it will be understood by those skilled in the art that various modifications both in the apparatus and its mode of operation may be made therein without departing from the spirit and scope of the invention. For example, the machine could be manually operated if desired by substituting clamps such as toggle clamps for clamping pistons 79, 81 and employing counterweighted saws equipped with levers for manual manipulation. The load and unload movement could also be accomplished manually by maintaining uniform pressure of the movable platform against the pattern piece by conventional mechanical means, as, for example, a counterweight attached to platform 23. Movement of the movable platform could be accomplished by other than electro-pneumatic means, as for example rack and pinion, worm gear, cable drive, etc., alternatively, the movable platform 23 could be motor driven. For certain cutting operations such as cutting metal, suitable cooling means could be employed and actuated by conventional circuitry. Exhaust air from the operation could be employed to prevent accumulation of chips or sawdust. In view of such modifications, it is the intention to be limited only as specified in the following claims.

What is claimed is:

1. A device for severing a stock member to predetermined dimensions under control of a non-contiguous pattern piece comprising in combination first and second cutting means positioned in a predetermined spatial relationship, at least on of said cutting means being fixed and the other movable, reference means responsive to one dimension of said non-contiguous pattern piece for moving said movable cutting means to a position whereby the distance between said cutting means corresponds to the linear dimension of said non-contiguous pattern piece and control means for actuating said first and second cutting means in said position to sever said stock member to provide a workpiece having a linear dimension bearing a predetermined relationship to said dimension of said non-contiguous pattern piece.

2. A device for automatically cutting a workpiece into a double sided miter corresponding in length to a function of a remotely positioned pattern piece comprising in combination fixed and movable cutting means positioned in spatial relationship, means for positioning said movable cutting means to a first position during a first sequence to permit insertion of said remotely positioned pattern piece in said device, control means coacting with said pattern piece for positioning said movable cutting means in a second position during a second sequence, the distance between said cutting means in said second position varying as a function of one dimension of said remotely positioned pattern piece and means for actuating said cutting means in said second position during a third sequence to sever said workpiece whereby the linear dimension of said severed workpiece and said remotely positioned pattern piece bear a fixed relationship to each other.

3. A device of the character claimed in claim 2 wherein said cutting means comprises rotating saw blades and wherein said means for actuating said cutting means includes a pneumatically controlled cylinder.

4. A device for automatically cutting a member to dimensions having a predetermined relationship to an associated pattern piece comprising in combination a fixed platform, a movable platform, cutting means mounted on each of said platforms, a pattern piece positioned in fixed spatial relationship to one of said cutting means, means for moving said movable platform to a first position, means including said pattern piece for moving said movable platform to a second position, the distance between said cutting means in said second position being related as a function of the dimension of said pattern piece and means for actuating said cutting means to sever said member in a cutting sequence to provide said predetermined relationship between said severed member and said associated pattern piece.

5. A device of the character claimed in claim 4 further comprising means for maintaining said member in proper orientation during said cutting sequence.

6. A device of the character claimed in claim 5 wherein said means for maintaining said member in proper orientation comprises a gate member against which the cutting is to occur and means for securing said member firmly against said gate member during said cutting sequence.

7. A device of the character claimed in claim 6 wherein said cutting means comprises rotating saw blades which rotate in a direction opposed to the orientation of said member.

8. A device for automatically setting the relative spacing between a plurality of cutting means to correspond to the linear dimensions of an associated pattern piece, comprising in combination
a fixed and movable cutting means,
said associated pattern piece being positioned remotely with respect to said cutting means,
a work piece positioned in proximity to said cutting means,
means for positioning said cutting means to a first position to permit insertion of said remotely positioned pattern piece,
and means coacting between said remotely positioned pattern piece and said relatively spaced cutting means for positioning said cutting means to a second position wherein the distance between said cutting means varies as a function of the dimension of one side of said remotely positioned pattern piece.

9. A device of the character claimed in claim 8 wherein said coacting means for positioning said cutting means to said second position comprises a control element actuated by contact between said cutting means and said pattern piece.

10. A device of the character claimed in claim 9 wherein said control element comprises a micro-switch actuated by contact between a bracket associated with said relatively spaced cutting means and said pattern piece.

11. A device for automatically cutting miter members adapted to conform to the dimensions of an associated pattern piece from a workpiece comprising in combination, a stationary platform having first cutting means mounted thereon, a movable platform having second cutting means mounted thereon, control means for moving said movable platform to a first position, a pattern piece, control means for moving said movable platform to a second position, said latter movement being terminated by said associated pattern piece, a guide member for orienting said workpiece, means for holding said workpiece against said guide member during the cutting operation and control means for actuating said cutting means in a predetermined sequence.

12. A device of the character claimed in claim 11 wherein said control means for actuating said cutting means in a predetermined sequence comprises an orifice associated with each of said cutting means, the cutting sequence being controlled by the relative size of the orifices associated with said respective cutting means.

13. A device of the character described in claim 12 further comprising control means actuated by termination of said cutting sequence to release said workpiece and said pattern piece.

14. A device for automatically cutting stock members into miter members corresponding to the dimensions of an associated pattern piece comprising in combination first cutting means, second cutting means, each of said means having an associated platform, said cutting means comprising pneumatically controlled rotating saws, pneumatic control means providing lateral movement of one of said platforms with respect to the other, control means for automatically positioning said platforms and associated rotating saws in accordance with the dimension of the associated pattern piece, a guide member for positioning said stock member, means for maintaining said stock member against said guide member during the cutting operation, means for actuating said rotating saws, means to cause said rotating saws to pivot to a cutting position in a predetermined sequence and control means responsive to the completion of cutting by the second of said saws for causing said saws to retract to their normal position and to release said workpiece.

15. A device of the character claimed in claim 14 wherein said control means for automatically positioning said rotating saws comprises a bracket attached to one of said platforms having measuring extremities attached thereto for engaging said pattern piece.

16. A device of the character claimed in claim 14 wherein said control means for causing said saws to retract to their normal position and to release said workpiece comprises a microswitch associated with the last cutting saw to be operated for opening the pneumatic control line.

17. Apparatus for automatically cutting a workpiece to dimensions varying as a function of a specific pattern piece comprising in combination
first and second cutting members,
one of said cutting members being fixed and the other movable,
control means for positioning said cutting members in a first position to permit insertion of said pattern piece in said apparatus, said position of said pattern piece being remote with respect to the location of said first and second cutting means,
control means for positioning said cutting members in a second position after insertion of said pattern piece, the distance between said cutting members in said second position corresponding to the linear dimension of said remotely positioned pattern piece,
means for maintaining said workpiece in position during a cutting sequence,
and means for initiating providing said cutting sequence when said cutting members are in said second position relative to said pattern piece.

18. A device for automatically setting the relative spacing between a plurality of cutting means to conform to the dimensions of a non-contiguous pattern piece comprising in combination,
first and second cutting means, at least one of said cutting means being fixed,
means for positioning said pattern piece in fixed spatial relationship to said device in a location remote from said cutting means,
control means for modifying the relative spacing between said first and second cutting means to conform to the longitudinal dimension of one side of said pattern piece,
said control means including means coacting between said non-contiguous pattern piece and said cutting means for automatically positioning said cutting means as a function of the dimension of said one side of said pattern piece.

19. Apparatus of the type claimed in claim 17 wherein said pattern piece comprises a rectangle, each side of said rectangle being used in sequence to control said second position for each cutting cycle, the resulting four double mitered pieces forming a perfect mitered frame relative to said pattern piece.

References Cited

UNITED STATES PATENTS

| 823,506 | 6/1906 | Cadorette et al. | 143—6 |
|---|---|---|---|
| 881,793 | 3/1908 | Green | 144—144 |
| 1,700,683 | 1/1929 | Madsen | 143—47 |
| 2,662,563 | 12/1953 | Grove | 143—47 |
| 2,856,973 | 10/1958 | Horton | 143—38 |
| 2,851,071 | 9/1958 | Schils | 144—144 |

DONALD R. SCHRAN, Primary Examiner

U.S. Cl. X.R.

143—47